July 3, 1934.  A. H. STEWART  1,965,438
APPARATUS FOR FEEDING GLASS
Filed Sept. 21, 1932
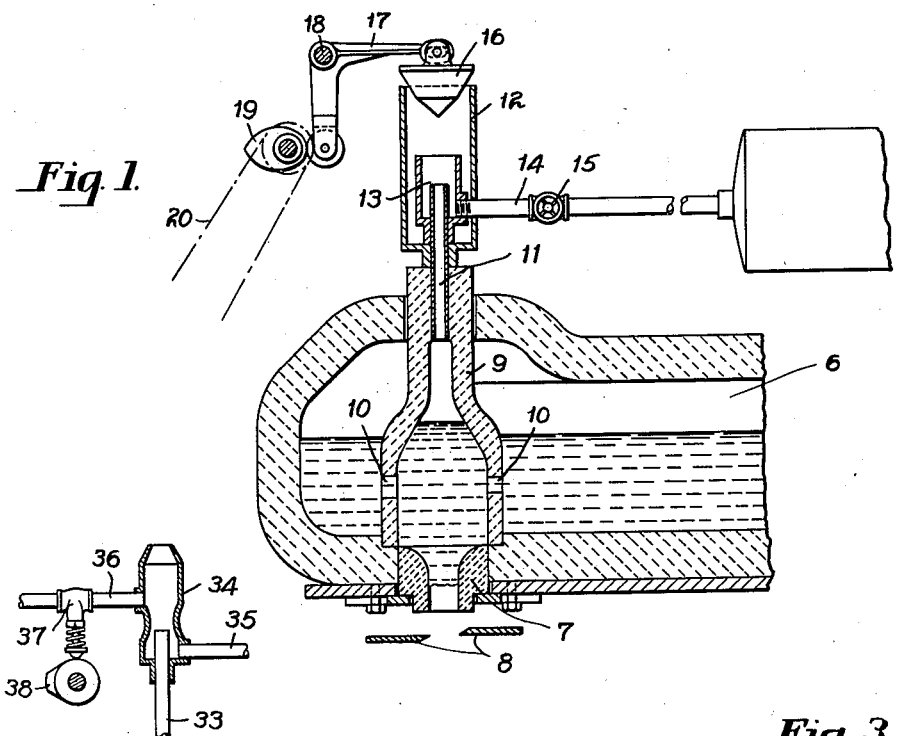
Fig. 1.
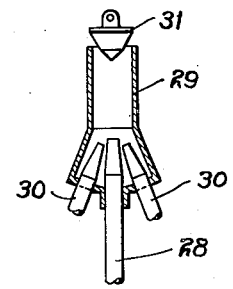
Fig. 4.
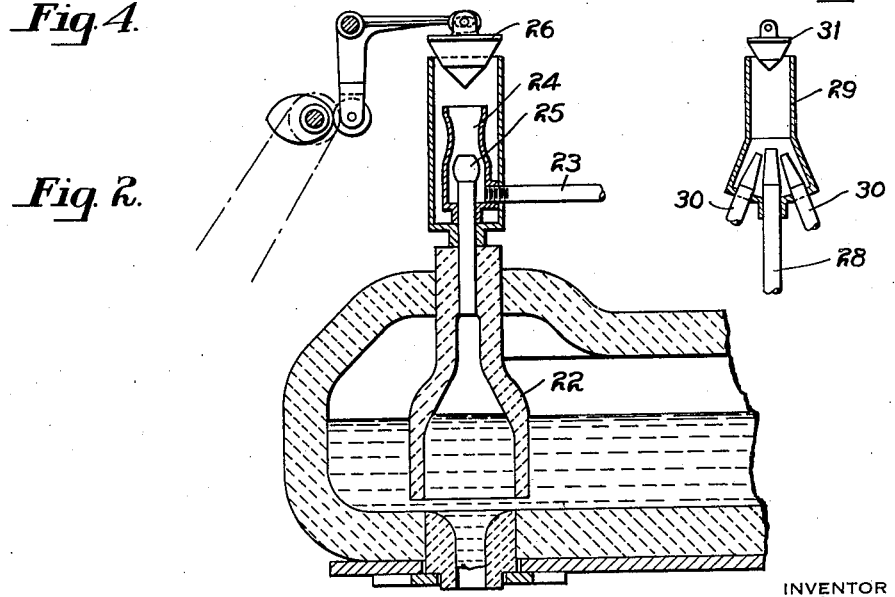
Fig. 2.
Fig. 3.
INVENTOR
Andrew H. Stewart,
By Archworth Martin,
Attorney.

Patented July 3, 1934

1,965,438

UNITED STATES PATENT OFFICE 1,965,438

APPARATUS FOR FEEDING GLASS

Andrew H. Stewart, Shields, Pa.

Application September 21, 1932, Serial No. 634,177

4 Claims. (Cl. 49—55)

My invention, relates to a method of and apparatus for feeding glass, and particularly to that class of apparatus wherein gathers or charges of glass are supplied from a furnace boot or forehearth, through an orifice located in the bottom of the boot. Certain features of the invention, however, are applicable also to other types of apparatus.

In the feeding of glass charges to molds, and particularly in the feeding of charges for the machine production of small articles, many difficulties have been experienced in accurately controlling the sizes and shapes of the charges. Among the methods employed for feeding charges of glass have been that of fluid pressure control, involving pressures and vacuum within a bell disposed above the flow ring commonly found at the bottom of a furnace boot.

Some of these systems involve the use of pressure within the bell to effect an expulsion of glass through the flow ring, a more or less predetermined volume of the extruded glass being then sheared off to form a mold charge. Vacuum is then created within the bell to draw back from the orifice the glass which remains therein after the shearing operation. Pressure is then again applied, and the steps referred to are repeated, to form successive charges of glass.

An objection to some of these older systems is the difficulty of accurately controlling the amount of glass which will be directed through the flow ring during each cycle of operation, owing to the wide range in pressures within the bell, and the rapid change from pressure to vacuum.

My invention has for its object to provide a simplified means and a novel method for creating vacuum and pressure conditions within the bell.

Some forms of apparatus by which my invention may be practised are shown in the accompanying drawing, wherein Figure 1 is a longitudinal sectional view through a portion of a forehearth or boot, and of feeding apparatus associated therewith; Fig. 2 is a view similar to Fig. 1, but showing a modified form of structure; Fig. 3 shows another manner in which vacuum may be created within a bell, and Fig. 4 shows still another modification.

Referring first to Fig. 1, I show a forehearth or boot 6 that is provided with the usual flow ring or orifice 7 that is detachably supported in the bottom of the boot. Shears 8 of any suitable well-known form are periodically operated to sever charges of glass from the molten glass that passes through the flow ring.

A bell 9 is mounted within the boot and is provided with ports or openings 10 in its sides. These ports are preferably located at a plane between the uppermost and lowermost horizontal planes of the glass bath, and the ports 10 which lie nearest the front of the boot are preferably of larger area than the ports which are nearest to the melting tank.

This arrangement of ports serves not only to permit the withdrawal of molten glass from the plane of the bath where the glass remains at a more uniform temperature, and is not subjected to quick changes, but also causes a greater flow of glass from the front part of the boot into the bell, whereby that portion of the bath which usually cools the more rapidly is maintained at a higher temperature, because of constant movement or circulation of the hotter glass to the front side of the boot. These features, however, are described and claimed at length in a copending application filed by me.

The bell 9 is provided with a hollow stem or conduit 11 which extends into a chamber 12. A Venturi or ejector conduit 13 is mounted within the chamber 12 and surrounds the upper end of the vacuum conduit 11. A pipe 14 leads into the Venturi conduit 13 from a suitable source of air pressure, the pipe being provided with a valve 15 for manually controlling flow of air pressure to the Venturi conduit.

A valve 16 cooperates with the upper open end of the chamber 12 to control flow of air from said chamber. The valve is operated by a bell crank 17 which is pivotally mounted at 18 on a fixed axis. The vertical arm of the bell crank has a roller that cooperates with a cam 19, the cam being driven by a belt or chain 20 from any desired point, and preferably in predetermined relation with respect to the movement of a mold table (not shown) such as those commonly placed beneath the feeding orifices of large glass furnace boots. It will be seen that as the cam 19 is rotated, the bell crank will be oscillated to raise and lower the valve 16.

One advantage of my invention resides in the fact that instead of having to provide both a compressor and a vacuum pump, with the necessary lines, valves, etc., for communication with the interior of the bell and for controlling flow of air to and from the bell, I am able, by the use of only an air compressor, to control the movement of glass through the flow ring, and nevertheless effect the periodic application of vacuum within the bell. Furthermore, the compressed air flow through the pressure line may be constant, so that there is no building up of pressure therein and resulting surges, such as are created when a pressure line is opened and closed quickly.

Air under pressure from the pipe 14, flowing through the Venturi conduit 13 with the valve 16 in open position, will be discharged from the upper end of the chamber 12. Movement of this air through the conduit 13 will create a suction in the stem 11, and a partial vacuum within the bell 9. The degree of vacuum will, of course, primarily depend upon the degree of air pressure, but control of the vacuum can be effected by the extent to which the valve 16 is moved relative to its seat. Thus, if the valve 16 is raised so high as to not appreciably obstruct flow from the chamber 12, the degree of vacuum within the bell will be greater than if the valve 16 is closer to its seat.

If the valve is moved so close to its seat as to create such resistance to the flow of the air under pressure that there is no appreciable suction in the pipe 11, the glass from the bell 9 may flow through the orifice by gravity, and the stream sheared.

Flow may be interrupted by raising movement of the valve 16 which will again permit freer flow of compressed air through the chamber 12, it being apparent that raising and lowering movement of the valve will result in intermittent movement of glass through the flow ring.

If the valve 16 is completely or nearly closed, air pressure will be directed into the bell 9, causing a forcible extrusion of the glass and supplementing the gravity flow thereof.

Under some conditions it will be desired to produce recurrent states of pressure and vacuum within the bell, while under other conditions, it will be sufficient simply to vary the pressure within the bell from that of atmospheric pressure to partial vacuum.

The degrees of pressure and vacuum created within the bell will depend upon the viscosity or temperature of the glass bath, and the size of mold charges which it is desired to produce. Thus, with a very hot glass and small mold charges, little or no pressure need be admitted to the bell, but it can be maintained under various degrees of vacuum, or alternate between atmospheric pressure and partial vacuum, while for larger mold charges and more viscous glass, less vacuum may be required and considerable air pressure may be introduced from the pipe 14 through the stem 11. These various pressure conditions may be effected without changing the pressure in the line 14, by simply adjusting the cam 19 or the bell crank.

The bell crank roller can be adjusted vertically with respect to the pivot 18, to regulate the extent to which the valve 16 is raised and lowered. Furthermore, the cam 19 can be adjusted circumferentially of its axis in order to vary the timing of valve movements with relation to movement of the molds beneath the orifice 7.

In Fig. 2, I show a structure similar to that of Fig. 1, but with a different form of bell and another arrangement of Venturi structure. The bell 22 is shown as raised slightly from the bottom of the boot, so that glass will flow under the lower edge of the bell to enter the flow ring, instead of flowing through ports in the side of the bell. Of course, the bells of Figs. 1 and 2 could be interchanged one with the other, and the bell 22 could have ports in its sides and also be raised slightly from the boot of the forehearth, so that some of the glass would enter through the ports and some flow beneath the bell.

The pressure line 23 corresponds to the line 14 and communicates with a Venturi pipe 24. The upper end of the bell stem 25 is enlarged and the pipe adjacent thereto restricted, so that a greater suction will be created with a given amount of air pressure than in the structure of Fig. 1. In the structure of Fig. 2, the valve 26 is manipulated in substantially the same manner as the valve 16.

In Fig. 3, a bell stem 28 extends into the Venturi conduit 29, and fluid pressure is supplied from pipes 30, the pressure as it emerges from the restricted ends of these pipes creating a drag or suction within the pipe 28, and producing vacuum within the bell. Here again, the degree of vacuum is controlled by a valve 31, and such valve may be manipulated to effect pulsations within the bell, either by simply varying the degree of vacuum or by causing vacuum and pressure conditions to periodically alternate with one another in the bell, so as to effect periodic impulses at the flow ring. These impulses may, of course, be alternately suction and pressure, or be merely a variation in the degree of vacuum, so that there will be intermittent flow through the flow ring.

Referring now to Fig. 4, I show a structure wherein a bell stem 33 enters a Venturi conduit 34 to which pressure is supplied from a pipe 35, these parts corresponding to the members 11, 13 and 14, respectively of Fig. 1.

Instead of employing a valve to check or prevent flow from the upper end of the conduit 34, I periodically admit air pressure thereto from a pipe 36. The pipes 35 and 36 may lead from a single source, and flow through the pipe 35 is controlled by a valve 37 which is periodically operated by a cam 38 that corresponds to the cam 19.

Assuming the valve 37 to be closed, with pressure entering the conduit 34 from the pipe 35, suction is created in the stem 33 to produce some vacuum in the bell to which the stem is connected. To reduce this vacuum, the valve 37 is opened to a desired degree by the cam 38, thus admitting air under pressure to the conduit 34 and causing opposition to flow of air under pressure from the pipe 35. The degree to which this pressure flow is opposed will, of course, determine the extent to which the vacuum is relieved. By restricting the outlet at the upper end of the conduit 34 sufficiently, an actual pressure condition can be obtained within the stem 33 and the bell to effect a feeding impulse to the glass within the bell.

The "throw" of the cam will, of course, determine the extent to which the vacuum within the stem 33 is relieved, or pressure created in the stem. Thus in feeding very small charges of highly fluid glass, the vacuum may never be entirely relieved, while for larger charges or more viscuous glass, the cam 38 may be so arranged as to periodically admit up to full line pressure through the pipe 36, and thereby create pressure within the stem 33.

I claim as my invention:

1. The combination with a glass furnace boot or the like having a discharge orifice in its lower side, of a bell disposed above said orifice and communicating with the space in the boot at a point below the pool level, a hollow stem extending into the bell, a Venturi conduit at the upper end of the stem, means for directing fluid under pressure into said conduit to create suction within the bell, and means at the discharge end of said conduit, operable periodically and independently of changes in glass level, to obstruct said flow.

2. The combination with a glass furnace boot or the like having a discharge orifice in its lower side, of a bell disposed above said orifice and communicating with the space in the boot at a point below the pool level, means for creating suction within the bell by flow of fluid under pressure past a conduit that communicates with said bell, means for varying the rate of said flow, and means operating independently of changes in glass level for diverting said flow to the interior of the bell.

3. The combination with a receptacle for molten glass having a discharge orifice in its bottom, of an air-confining enclosure above said orifice and closed at its lower end by the glass, a Venturi conduit having communication with the said enclosure, means for directing fluid under pressure through said conduit to create suction within said enclosure, and periodically-operable means for obstructing flow from said conduit, to create pressure within the enclosure, the last-named means being operated independently of changes in glass level.

4. The combination with a receptacle for molten glass having a discharge orifice in its bottom, of an air-confining enclosure above said orifice and closed at its lower end by the glass, a Venturi conduit having communication with the said enclosure, means for directing fluid under pressure through said conduit to create suction within said enclosure, and means operable without interruption of the flow of fluid and independently of changes in glass level for periodically directing said fluid into the said enclosure, to create pressure therein.

ANDREW H. STEWART.